Figure 1:
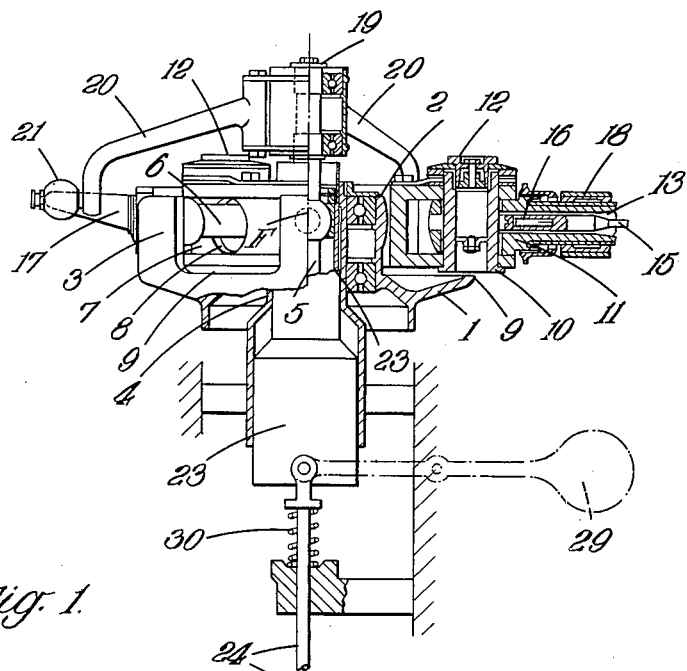
Figure 1:
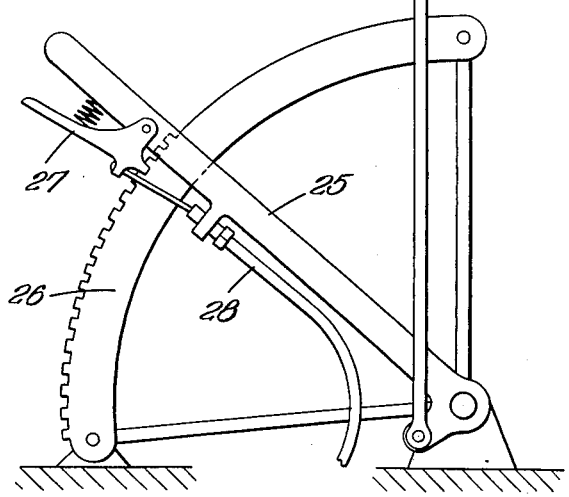

March 21, 1939.    R. HAFNER    2,150,969
ROTARY WING AIRCRAFT
Filed Dec. 12, 1936    2 Sheets-Sheet 1

Raoul Hafner
INVENTOR
By [signature]
his ATTY.

March 21, 1939. R. HAFNER 2,150,969
ROTARY WING AIRCRAFT
Filed Dec. 12, 1936 2 Sheets-Sheet 2

Raoul Hafner
INVENTOR

Patented Mar. 21, 1939

2,150,969

UNITED STATES PATENT OFFICE

2,150,969
ROTARY WING AIRCRAFT
Raoul Hafner, Vienna, Austria

Application December 12, 1936, Serial No. 115,530
In Great Britain December 19, 1935

9 Claims. (Cl. 244—18)

This invention relates to rotary wing aircraft, of the kind in which the sustaining blades are rockable together about individual pitch-change axes for alteration of the general rotor pitch, and its principal object is to effect general improvements in the mechanism for so rocking them.

According to the invention there are provided a manually operable control member having a "reversible" operative connection with the blades for so rocking them, and stabilising means acting, preferably independently of the control connections, to maintain each blade resiliently at a predetermined optimum pitch angle. By a "reversible" connection is meant one which has a mechanical advantage sufficiently low for blade reactions about their pitch-change axes to affect the pitch changing member. By reason of this low mechanical advantage, large changes of pitch may be made instantaneously by the pilot, whilst the resilient reaction of the stabilising means, being transmitted to the hand, forms a reliable and exact indication of the value of general rotor pitch at any instant.

The arrangement of the invention thus has all the characteristics of a direct, stable, and sensitive flight control system, as compared with a "non-reversible" pitch trimming or adjusting gear, and an aircraft equipped therewith is capable of certain highly advantageous operations which would not otherwise be possible or safe to attempt.

For example, in the case of autorotative wing aircraft, in which the blades are not normally power-driven but autorotate in the wind past the aircraft during flight, it is common to use the airscrew engine, prior to flight, to give the rotor an initial rotation in order to reduce the take-off run. By means of a control system according to the invention the rotor may set to its condition of minimum rotational drag (which in practice approximates to zero blade pitch) and therefore brought by means of the limited power available to an abnormally high rate of revolution. On quickly de-clutching the engine and increasing the rotor pitch, the aircraft will be raised from the ground by virtue of the excess kinetic energy in the blades, and if the manoeuvre has been correctly executed the aircraft will have gathered sufficient forward speed, by the time the rotor speed has fallen to the normal auto-rotational value, to prevent a return to earth.

Similarly, at the end of a vertical descent the rotor pitch may be increased to obtain a momentary extra lift and check or brake the descent as the aircraft settles on the ground.

Such manoeuvres, however, evidently require a smooth, rapid, and delicate control of the rotor pitch, and it is obvious that a conventional trimming gear, even if it could be operated to change the rotor pitch quickly enough, would not give the pilot the general "feel" of the rotor which is essential for the purposes in question. It may also be noted that the invention makes it possible for the pilot to reduce the rotor pitch and lift instantaneously to zero at the moment when the aircraft touches the ground on landing; this substantially eliminates the critical period when the aircraft is neither fully air-borne nor held firmly on the ground by its weight, and is liable to be overturned if it is not facing exactly into the wind.

The invention has further and important features and advantages, as will be apparent from the following description and accompanying drawings, which relate to a successful form thereof applied to an auto-rotative wing aircraft.

Figure 2:
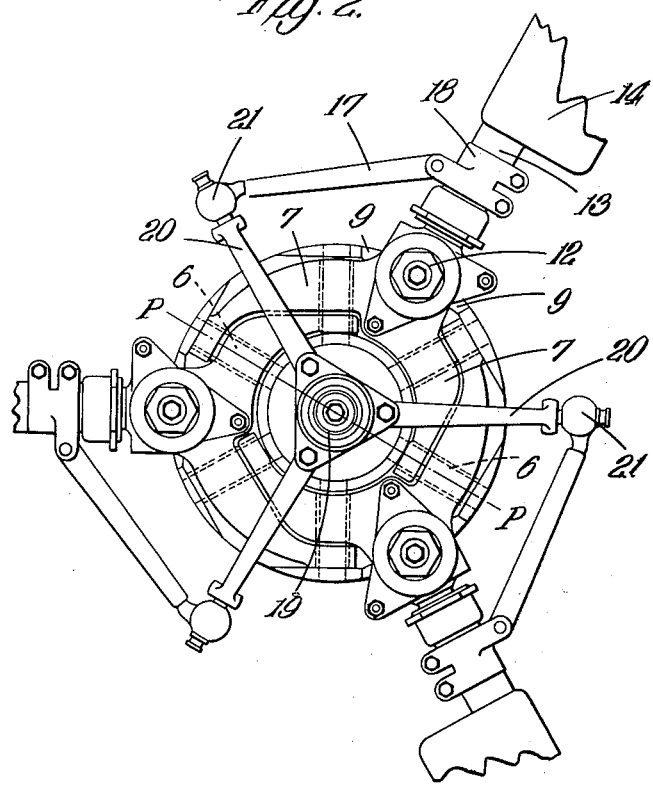

Of the drawings:
Figure 1 is a side view, partly diagrammatic, of the essential parts, and
Figure 2 is a plan view of the rotor hub structure and blade root articulations.

In this construction the rotary hub 1 is generally bowl-shaped with upstanding cylindrical inner and outer walls 2 and 3. The inner wall 2 is journalled upon a tubular axle 4 through which passes a vertical control column 5.

Three blades are provided, which are pivoted to the hub about individual flapping axes P—P which are coplanar and intersect the rotational axis of the hub at a common point F. Flapping pins 6 are arranged on these axes and are carried at their inner and outer ends by the walls 2 and 3 of the hub, and the blade roots carry forks 7 which nest in regularly interlapping relationship in the annular space between these walls and are pivoted at their ends to the respective pins 6. The fork arms of each blade are cut away or apertured at 8 to give passage to the flapping pins relating to the other blades.

The outer wall 3 of the hub is cut away at 9 in three places to accommodate the shanks of the forks 7, and these shanks carry vertical "drag" pivot pins 10 about each of which is pivoted the knuckle end of a short tubular blade supporting arm 11. An adjustable friction damper 12 is associated with this pivot.

The root portion of the blade spar consists of a steel tube 13 which is provided with a streamline fairing 14 and is a sliding fit over the supporting arm 11, so that it may rock about its longitudinal axis to vary the blade pitch. The function of the arm 11 is to support the blade when at rest, and there is of course no substantial friction between these parts when the aircraft is in flight.

The blade is anchored internally and radially to its root articulations by a torsionally resilient tie member 15, in the form of a steel rod swaged up and externally threaded at its ends, and lying along the common axis of the spar root 13 and the supporting arm 11. At its outer end the tie rod 15 is secured to the blade structure, and at its inner end it engages with an internal screwthread in the supporting arm 11 and is similarly secured by a screwed plug and taper pin assembly 16.

The blade pitch is controlled by a radius arm 17 which is pivoted about a vertical axis to a clamp 18 secured around the spar root and projects generally forwardly of the blade in the direction of rotation. The upper end of the central control column 5 projects above the hub and carries a rotary head 19, from which three spider arms 20 project. The latter curve somewhat downwardly and their free ends are ball jointed at 21 to the free ends of the radius arms 17. One of the spider arms is rigidly secured to the rotary head 19 in the manner of a "master" arm, but the other two arms are pivoted at their roots about vertical axes to the rotary head; the mutual angular disposition of these arms can thus vary slightly in accordance with movements of the blades about their "drag" pivots.

The control member 5 is universally mounted at 22 inside a hollow "pot" 23 which in turn is vertically slidable to a slight extent in the hollow rotor spindle 4. When the member 5 is tilted in any direction by a pilot's control column (not shown), the pitch angles of the blades are cyclically or "differentially" varied for a brief period until they have been, as it were, "led" into the new plane of rotation of the ball joints 21, thus correspondingly tilting the true rotary axis and thrust line of the rotor about the point F.

Variation of the pitch of a blade is opposed only by the torsional resilience of its tie rod, there being no frictional restraint as would be the case if thrust bearings were used at the blade roots. This is of particular importance during the period when the blade pitches are changing "differentially", since each blade anchorage produces a harmonically varying reaction on the control assembly instead of a frictional reaction which would be constant in value and subject only to rapid reversal. Moreover, where there are three or a multiple of three blades these harmonic variations will sum to zero at any instant, leaving only (as consideration will show) a basic steady reaction urging the control system resiliently to its central position.

By raising or lowering the "pot" 23 the general pitch of the rotor as a whole is varied, this being the control with which the invention is primarily concerned. Here again, departure of any blade from its optimum (autorotational) pitch angle causes torsional flexure of its tie 15 and is opposed by the resilience thereof. The "pot" 23 is moved vertically by a push-rod "reversible" connection 24 to an inclined rockable lever 25 at the pilot's hand. The arrangement is such that raising the lever increases the rotor pitch and vice versa, so that when the pilot makes an instinctive movement to "pull up" the aircraft the machine responds appropriately, i. e. rising from the ground if starting, checking itself if descending, or lifting sharply if the operation is performed during forward flight.

Owing to the action of the blades and their torsionally-flexible anchorages, this lever will, if left to itself during flight, remain resiliently in the position corresponding to the best general autorotative value of the rotor pitch. However, for trimming purposes the lever works over a toothed quadrant 26 and carries a releasable catch 27 in the manner of a vehicle brake lever. The serrations in the quadrant do not extend beyond a position corresponding to a safe maximum autorotative rotor pitch, since if a larger pitch than this were held for any time the rotor would be in danger of stalling, but they extend down to the position of minimum rotor pitch and drag in order that the lever may be held in a suitable position without effort or attention while speeding up the rotor preparatory to taking off.

The aircraft has a tractor airscrew driven by an engine in the nose, the engine being adapted to supply a starting torque to the rotor through quickly-releasable clutch means. The clutch release device is connected by a "Bowden" wire connection 28 to the lever catch 27 in such a way that when the latter is gripped in moving the lever the clutch is automatically released.

This arrangement enables a vertical take-off to be achieved in the following manner:

The pilot sets the pitch control lever 25 at the minimum position and operates the main clutch and throttle, gradually working the rotor up to its full speed at its minimum drag setting. The pitch control lever is then pulled smoothly up, and in a single rapid operation disconnects the rotor drive, allowing the full power output to be applied to the tractor screw, and without delay increases the pitch to commence raising the aircraft vertically from the ground before any revolutions have been lost. During this operation the catch on the lever is gripped in the released position to allow of the necessary delicate and graduated movements by the pilot, but as soon as the aircraft has settled down to forward flight the lever 25 is locked in the optimum autorotative pitch position.

It will be observed that the connection of the push rod 24 to the lever 25 is such that the pitch control is much finer at angles near the no-lift setting than at higher angles; this is desirable owing to the great sensitivity of the rotor to a small increase in pitch when it is rotating at its highest speed. In this connection it may be noted, however, that the effect of coarse handling of the pitch control, (or the similar effect of "bumps" or gusts encountered during flight) is much reduced by the automatic reduction in rotor pitch which accompanies any increased upward coning of the blades, owing to the geometry of the control connections carried by the bulb.

The weight of the control connections may be counteracted by a balancing mass 29, but it is preferred to use a spring 30 for this purpose so as to retain the "live" quality of the pitch control in operation, as well as avoiding the introduction of dead weight or inertia into the system.

Many additions and modifications may obviously be made to the particular aircraft described above without departing from the invention. For example, the aircraft is preferably provided with landing or supporting wheel brakes which are also automatically released through the "Bowden" connection 28 when the pitch control lever is operated.

I claim:

1. In a rotary wing aircraft, the combination of a sustaining rotor system comprising a plurality of controllable pitch blades radiating from a common hub, a pilot's control member for varying together the pitch angles of said blades, reversely actuable control connections between said control member and said blades, and a plurality of stabilizing means each disposed between a blade and the hub and resiliently opposing alterations of the pitch of the associated blade in either direction from a predetermined value, said means acting directly on said blades and indirectly through said control connections, on said control member.

2. In a rotary wing aircraft, the combination as claimed in claim 1, and wherein the said predetermined angle is the optimum pitch angle for autorotation of said rotor system.

3. In a rotary wing aircraft, the combination as claimed in claim 1, and wherein each of said stabilizing means comprises a torsionally resilient anchorage securing a blade to said hub structure against centrifugal force.

4. In a rotary wing aircraft, the combination as claimed in claim 1, and in which the mean pitch of said rotor system is reducible to the no-lift value.

5. In a rotary wing aircraft, the combination as claimed in claim 1, and including power means for accelerating said rotor system, prior to flight and when at the no-lift pitch value, to a rotational speed substantially in excess of its mean rotational speed in flight.

6. In a rotary wing aircraft, the combination as claimed in claim 1, and including power means for accelerating said rotor system, prior to flight and when at the no-lift pitch value, to a rotational speed substantially in excess of its mean rotational speed in flight, and means operable together with said pitch control member for interrupting the power transmission to said rotor system.

7. In a rotary wing aircraft, the combination as claimed in claim 1, and including power means for accelerating said rotor system, prior to flight and when at the no-lift pitch value, to a rotational speed substantially in excess of its mean rotational speed in flight, and pitch-changing operative connection between said control member and said rotor system the mechanical advantage of which is arranged to decrease progressively as the pitch of said rotor system is increased from the no-lift value.

8. In a rotary wing aircraft, the combination as claimed in claim 1, and including flapping pivots for said blades and means responsive to an upward flapping movement of a blade to decrease its pitch.

9. In a rotary wing aircraft, the combination as claimed in claim 1, including flapping pivots for said blades and a pitch-changing operative connection acting on each blade at a point in advance of its axis of pitch change, whereby an upward flapping movement of said blade is accompanied by a decrease in the pitch thereof.

RAOUL HAFNER.